United States Patent
Byrd

[11] Patent Number: 6,147,423
[45] Date of Patent: Nov. 14, 2000

[54] ELECTRIC MOTOR HAVING IMPROVED ROTOR ASSEMBLY, AND METHOD BY WHICH THE ROTOR ASSEMBLY IS MADE

[75] Inventor: David M. Byrd, Athens, Ga.

[73] Assignee: Reliance Electric Technologies, LLC, Thousand Oaks, Calif.

[21] Appl. No.: 09/409,216

[22] Filed: Sep. 30, 1999

[51] Int. Cl.[7] .................. H02K 23/60; H02K 13/00; H02K 17/16; H02K 1/22; H02K 19/14
[52] U.S. Cl. .................... 310/89; 310/125; 310/211; 310/124
[58] Field of Search .................... 310/197, 125, 310/89, 211, 124, 261; 363/150

[56] References Cited

U.S. PATENT DOCUMENTS

| | | | |
|---|---|---|---|
| 2,292,167 | 8/1942 | Smith | 310/212 |
| 3,027,474 | 3/1962 | Rosenberry, Jr. | 310/211 |
| 3,235,756 | 2/1966 | Anderson | 310/60 R |
| 3,987,324 | 10/1976 | Linkous | 310/197 |
| 4,158,225 | 6/1979 | Hertz | 363/150 |
| 5,068,560 | 11/1991 | Lundquist | 310/125 |

FOREIGN PATENT DOCUMENTS

| | | |
|---|---|---|
| 0058351 | 2/1982 | European Pat. Off. |
| 0058352 | 2/1982 | European Pat. Off. |
| 3308014 | 9/1984 | Germany |
| 57-126262 | 8/1982 | Japan |
| 62-290338 | 12/1987 | Japan |
| 63-11048 | 1/1988 | Japan |

Primary Examiner—Nestor Ramirez
Assistant Examiner—Guillermo Perez
Attorney, Agent, or Firm—Craig N. Killen; John J. Horn; William R. Walbrun

[57] ABSTRACT

A rotor assembly for an induction motor has cast end rings located at each axial end of a magnetically permeable core. The end rings electrically connect conductor bars extending through conductor channels in the core to provide a squirrel cage arrangement. The end rings are configured to define an annular peak along which a plurality of mounting sprews are located. Preferably, the mounting sprews are positioned between adjacent pairs of radial fan blades. The annular peak may be formed by a tapered structure which advantageously provides a narrower end ring width near the rotor's outer diameter surface. The reduced width at this location presents a higher resistance in the lock rotor condition, thus yielding an improved lock rotor specification in many cases. Due to the "deep bar effect," current will flow through the thicker portion of the end rings at higher operating speeds (i.e., lower slip frequency). As a result, a lower resistance will be realized as the motor is brought up to speed.

8 Claims, 5 Drawing Sheets

ELECTRIC MOTOR HAVING IMPROVED ROTOR ASSEMBLY, AND METHOD BY WHICH THE ROTOR ASSEMBLY IS MADE

BACKGROUND OF THE INVENTION

The present invention relates generally to the art of electric motors. More particularly, the invention relates to an improved rotor assembly for use in an electric motor and the casting process by which the rotor assembly is made.

Typically, the rotor assembly of an AC induction motor will be constructed as a "squirrel cage" in which a plurality of conductor bars are located in respective conductor channels defined in a magnetically permeable core. The magnetically permeable core, in turn, is generally formed from a multiplicity of individual laminations arranged in a stack. The conductor bars are electrically connected together by conductive end rings located at respective ends of the magnetically permeable core.

It is often specified that an electric motor not exceed a certain current draw in the lock rotor condition. The stator windings and various other parameters of the motor's construction are adjusted to ensure that the lock rotor current will not exceed the specified maximum. Thus, while stronger stator windings may be otherwise desirable, weaker stator windings are sometimes used to comply with the lock rotor current specification.

To manufacture the rotor, end ring casting molds are typically affixed to each end of the lamination stack. The lamination stack, with the casting molds affixed thereto, is oriented vertically to receive a quantity of molten metal (typically aluminum). Generally, the molten metal is injected into the bottom mold until all voids are filled. After the molten metal has cooled to rigidity, the casting molds are removed to yield the rotor assembly. The outer diameter of the resulting rotor may be machined to achieve the desired air gap when positioned inside of the stator core.

In the past, the common practice has been to form the end rings such that they have generally flat end surfaces. In other words, the end surface of the end ring is located in a plane transverse to the axis of the rotor. One problem with such an arrangement has been the occurrence of air bubbles in the end ring formed by the upper casting mold. In particular, air forced upward when the molten metal is injected into the lower casting mold tends to collect in the upper casting mold. While air escape orifices are provided in the upper casting mold, the shape of the end ring cavity does not facilitate the flow of trapped air toward those cavities.

SUMMARY OF THE INVENTION

The present invention recognizes and addresses the foregoing disadvantages, and others of prior art constructions and methods. Accordingly, it is an object of the present invention to provide an electric motor having an improved end ring structure.

It is a more particular object of the present invention to provide an end ring structure that facilitates the casting process by which squirrel cage rotors are made.

It is a more particular object of the present invention to provide an end ring structure that provides enhanced electrical resistance in the lock rotor condition.

It is a further object of the present invention to provide improved methodology for casting a squirrel cage rotor assembly.

Some of these objects are achieved by an electric motor comprising a housing structure and a shaft rotatably supported by the housing structure along a predetermined central axis. A stator, fixed with respect to the housing structure, has a plurality of conductive windings radially spaced about the central axis. A rotor is located radially inward of the stator and is fixed with respect to the shaft. The rotor includes first and second end ring structures respectively located at each end thereof. At least the first end ring structure defines an annular peak having a plurality of spaced apart mounting sprews located thereon. Preferably, both of the end ring structures define an annular peak along which the mounting sprews are located.

The end ring structures may each define a first surface tapering from a location nearer an outer diameter of the rotor. In such embodiments, a second surface may taper from a location nearer an inner diameter of the rotor, with the first surface and the second surface converging to define the annular peak. In one desirable construction, the first surface of each end ring structure tapers at an angle of least 30° with respect to a transverse dimension.

Frequently, each of the end ring structures may further comprise a plurality of axial fan blades located thereon. Respective sprews may be located between adjacent pairs of fan blades.

Other objects of the present invention are achieved by a rotor assembly for use in an electric motor of the induction type. The rotor assembly comprises a magnetically permeable core defining a plurality of parallel conductor channels extending axially therealong. A plurality of conductor bars are located in respective of the conductor channels.

The rotor assembly further comprises first and second end ring structures respectively located at each end of the core. The conductor bars are electrically connected by the end ring structures to provide a squirrel cage winding. Each of the end ring structures is configured to include a plurality of axial fan blades. In addition, the end ring structures each define an annular peak having a plurality of spaced apart mounting sprews located thereon.

In some exemplary embodiments, the end ring structures each define a first surface tapering from a location nearer an outer diameter of the core. A second surface tapers from a location nearer an inner diameter of the core. The first surface and second surface of each end ring structure converges to define the annular peak. In one desirable construction, the first surface of each end ring structure tapers at an angle of least 30° with respect to a transverse dimension.

Often, the end ring structures will be constructed with respective sprews being located between adjacent pairs of the fan blades. In addition, the conductor bars and end ring structures may be configured to be substantially coextensive in radial width. Frequently, the magnetically permeable core of the rotor assembly will be formed from a multiplicity of individual laminations arranged in a stack.

Other objects of the present invention are achieved by a method of producing a rotor assembly for use in an electric motor of the induction type. One step of the method involves providing a lamination stack formed of a magnetically permeable material. The lamination stack defines a plurality of parallel conductor channels extending axially therealong. Another step of the method involves providing first and second end ring casting molds defining respective first and second end ring cavities. Each of the cavities is configured such that a rotor end ring will be formed having a plurality of axial fan blades, and the rotor end ring will define an annular peak having a plurality of spaced apart mounting sprews located thereon. The first end ring mold defines molten metal inlet passages and the second end ring mold defines gas escape passages situated at selected locations.

According to a further step of the method, the lamination stack is situated in a vertical orientation with the first and second end ring casting molds located at a bottom end and a top end thereof, respectively. Finally, molten metal is delivered under pressure into the first casting mold. The molten metal fills the first end ring cavity, the conductor channels, and the second end ring cavity. Gas will desirably exit through the gas escape passages of the second end ring mold.

Other objects, features and aspects of the present invention are achieved by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
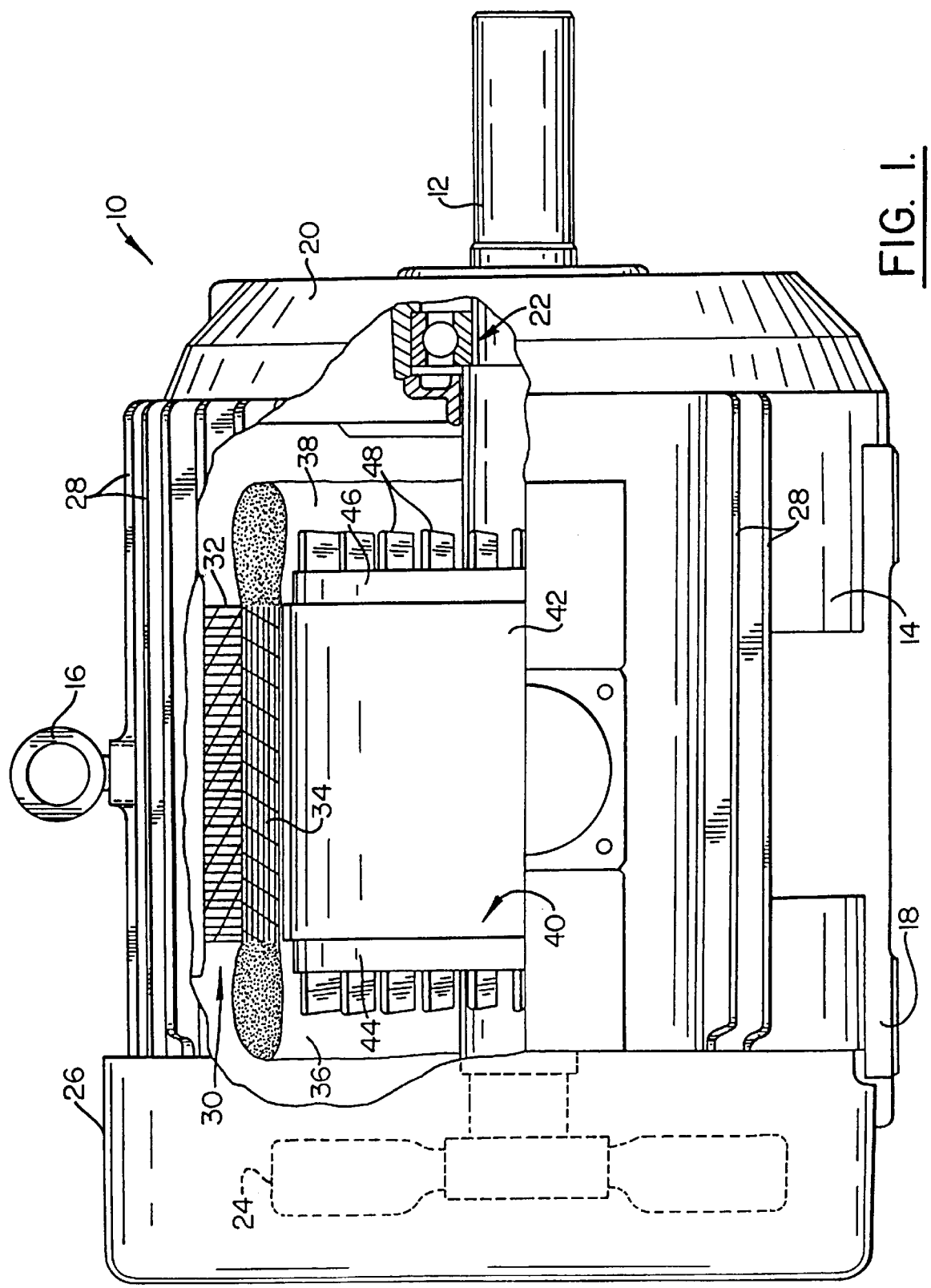
FIG. 1 is an elevational view of an electric motor showing the motor housing partially cut away to reveal various internal components therein.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates an electric motor 10 having a rotatable shaft 12 extending along a central axis. The internal components of motor 10 are enclosed by a housing including a main housing portion 14. One or more eyebolts 16 may be provided to facilitate lifting of motor 10. Main housing portion 14 defines an appropriate base 18 on which motor 10 will rest during use.

The housing of motor 10 further includes end portions, such as end bell 20, located at respective axial sides of main housing portion 14. The end portions may be attached to main housing portion 14 by any appropriate means, such as by bolts. Typically, each end portion will maintain a respective bearing assembly, such as bearing assembly 22, to facilitate rotation of shaft 12.

Shaft 12 continues through bearing assembly 22 and beyond end bell 20 for connection to other equipment. In this case, the opposite end of shaft 12 carries a fan 24, located within shroud 26. Due to the configuration of shroud 26, rotation of fan 24 causes cooling air to circulate around various cooling fins 28 defined on the exterior of main housing portion 14.

Inside of its housing, motor 10 includes a stator 30 that remains fixed during operation. Stator 30 includes a magnetically permeable core 32 preferably comprising a plurality of relatively thin laminations arranged in a stack. As indicated at 34, longitudinal windings are located in parallel, axially-extending slots defined about the inside surface of core 32 to provide a flow path for flux-generating current. The windings turn at respective coilheads 36 and 38 to return along a parallel slot. Typically, motor 10 will be constructed as a three-phase induction motor.

A rotor 40, secured to shaft 12, desirably rotates based on the electromagnetic interaction between it and stator 30. In the illustrated embodiment, rotor 40 is constructed as a "squirrel cage" in which a plurality of parallel conductor bars are spaced apart about a rotor core 42. The conductor bars are electrically interconnected by end rings 44 and 46 located at respective ends of core 42. A plurality of axial fan blades, such as those indicated at 48, are located on end rings 44 and 46 to circulate cooling air inside the motor housing.

Figure 2:
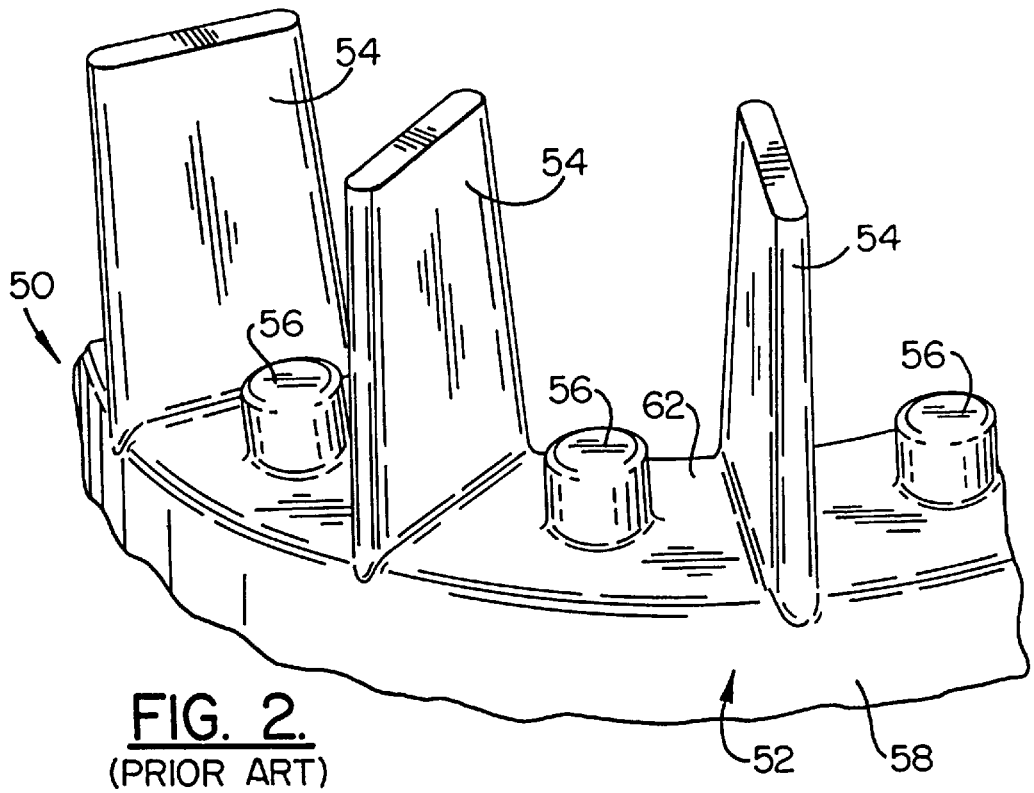
FIG. 2 is an enlarged fragmentary view of a portion of a rotor end ring constructed in accordance with the prior art.
Figure 3:
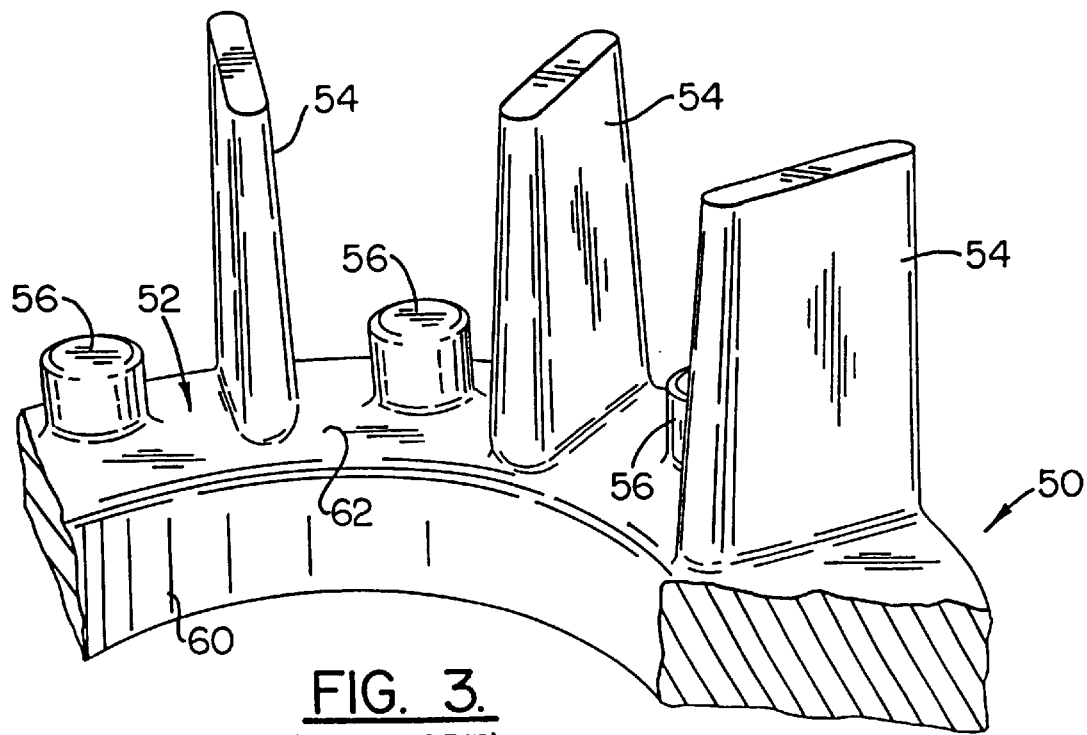
FIG. 3 is a reverse angle view of the prior art end ring shown in FIG. 2.

The present invention provides various improvements in the construction of the rotor assembly, and particularly the end rings located at each end of the rotor's magnetically permeable core. Before proceeding to specifically discuss an improved structure according to the present invention, it is helpful to first review in greater detail a typical end ring of the prior art. Thus, FIGS. 2 and 3 illustrate a portion of a prior art end ring 50.

As shown, end ring 50 includes a main ring portion 52 carrying a plurality of fan blades 54. Mounting sprews 56 are located between adjacent pairs of fan blades 54. As is well known, mounting sprews 56 serve as mounting locations for balancing weights that can be added to the rotor after it has been cast. Main ring portion 52 is formed by an outer axial surface 58 and an inner axial surface 60, interconnected by a transverse surface 62.

Figure 4:
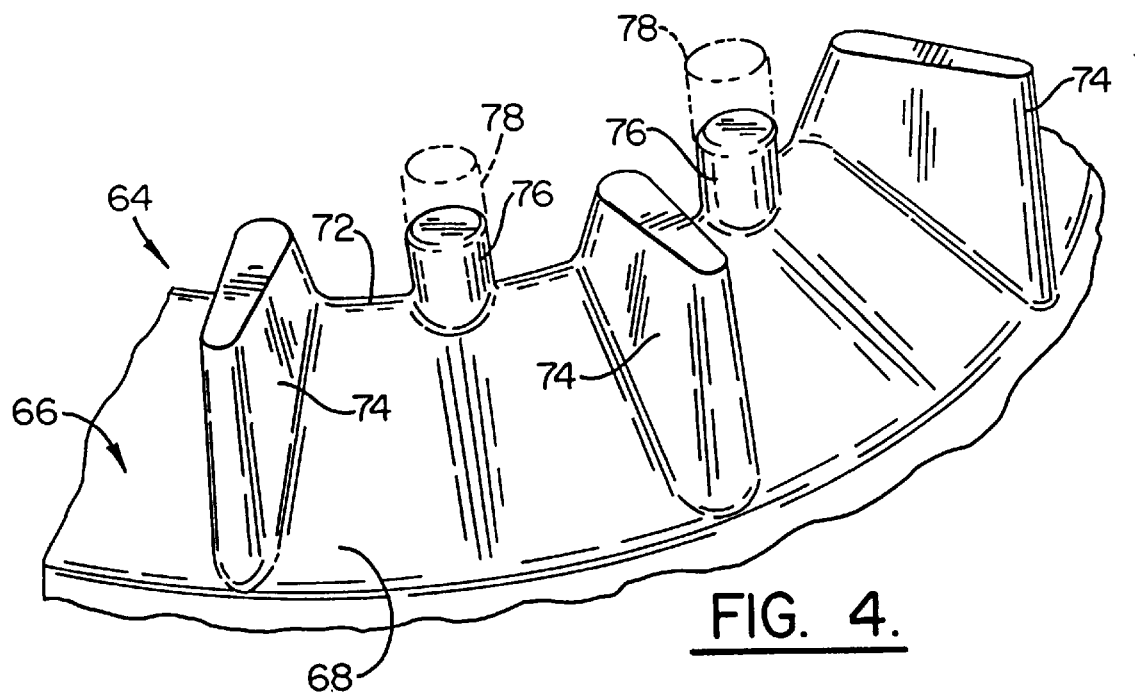
FIG. 4 is an enlarged fragmentary view of a portion of an end ring constructed in accordance with the present invention.
Figure 5:
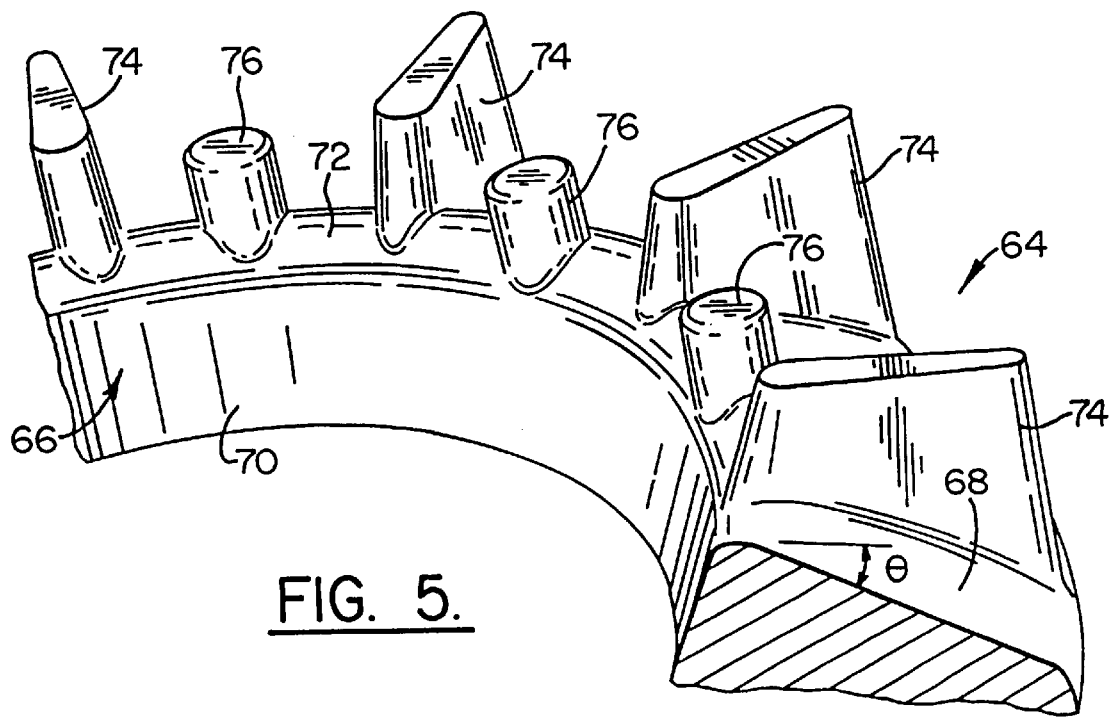
FIG. 5 is a reverse angle view of the end ring shown in FIG. 4.

FIGS. 4 and 5 illustrate an improved end ring 64 constructed in accordance with the present invention. End ring 64 includes a main ring portion 66 formed of an outer tapered surface 68 and an inner tapered surface 70 converging to form an annular peak 72. As can be seen, outer tapered surface 68 tapers at an angle Θ with respect to the transverse dimension. In some exemplary embodiments, the angle e may have an value of about 30°.

As can be seen, end ring 64 includes a plurality of axial fan blades 74. A plurality of mounting sprews 76 are located on annular peak 72 between adjacent pairs of fan blades 74.

The end ring construction provided by the present invention yields several advantages in relation to the conventional end ring construction of the prior art. As noted above, rotor assemblies are often formed by a casting process in which upper and lower end ring molds are located at respective ends of a vertical lamination stack. In the case of a conventional end ring construction, air often becomes trapped in the upper end ring mold, leading to an increased incidence of air bubbles in the cast end ring.

Because of the tapered shape provided by end ring 64, gas located in the upper end ring mold is more easily forced toward air escape orifices. Preferably, the air escape orifices will be located at a high point in the mold. As diagrammatically indicated at 78 in FIG. 4, the air escape orifices may be located directly above the location at which mounting sprews 76 are formed. Alternatively, it may be advantageous to locate the air escape orifices above the location where fan blades 74 are formed.

In addition, it is known that induction motors undergo a "deep bar effect" as the motor is brought up to speed. At start up, when the slip frequency between the rotating field of the stator and the induced field of the rotor is high, the "skin effect" causes most of the current flow to occur near the outer diameter surface of the conductor bars. As the slip frequency begins to diminish, the induced currents flow in a deeper portion of the conductor bars.

The deep bar effect is advantageously used in the present invention to allow the use of stronger stator windings than could often be used in similar motors of the prior art. Specifically, outer tapered surface 68 results in a reduced end ring width near the outer diameter surface of the rotor. The electrical resistance in this region of the end ring will be greater than the resistance at annular peak 72, where the end ring is thickest. As a result, the overall rotor winding will present a higher resistance to the stator when the slip frequency is high. The current drawn by the stator in the lock rotor condition is thus reduced. As such, a stronger stator winding can be used without exceeding a specified rating for the lock rotor current. At higher speeds, operation of the motor will not be changed since the current will be flowing through the thicker (i.e., lower resistance) portion of the end ring.

Figure 6:
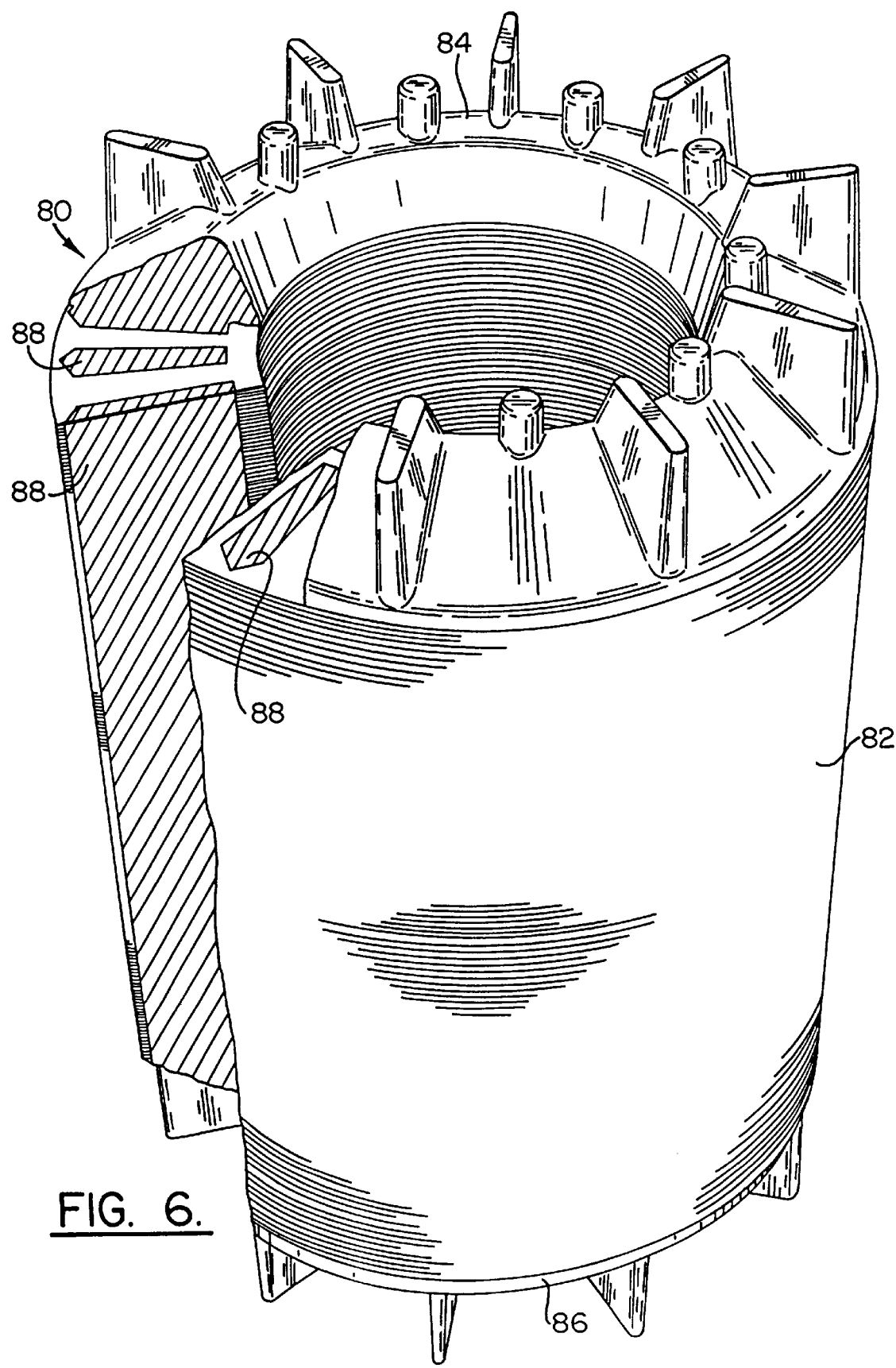
FIG. 6 is a perspective view of a rotor assembly made in accordance with the present invention with portions cut away to reveal the interior construction thereof.

FIG. 6 illustrates a rotor assembly 80 constructed in accordance with the present invention, as it may appear immediately after being cast. Rotor assembly 80 includes a magnetically permeable core formed of a plurality of individual laminations arranged in a stack 82. End rings 84 and 86, both of which are similar to end rings 64 discussed above, are located at respective ends of stack 82. Conductor bars 88 are located in parallel conductor channels defined in the lamination stack. It can be seen that conductor bars 88 have a radial extent substantially the same as that of the end rings.

After rotor assembly 80 is cast, its outer diameter surface may be machined to provide a predetermined air gap between it and the inner diameter surface of the stator core. After machining in this manner, rotor assembly 80 is affixed to the motor's shaft.

Figure 7:
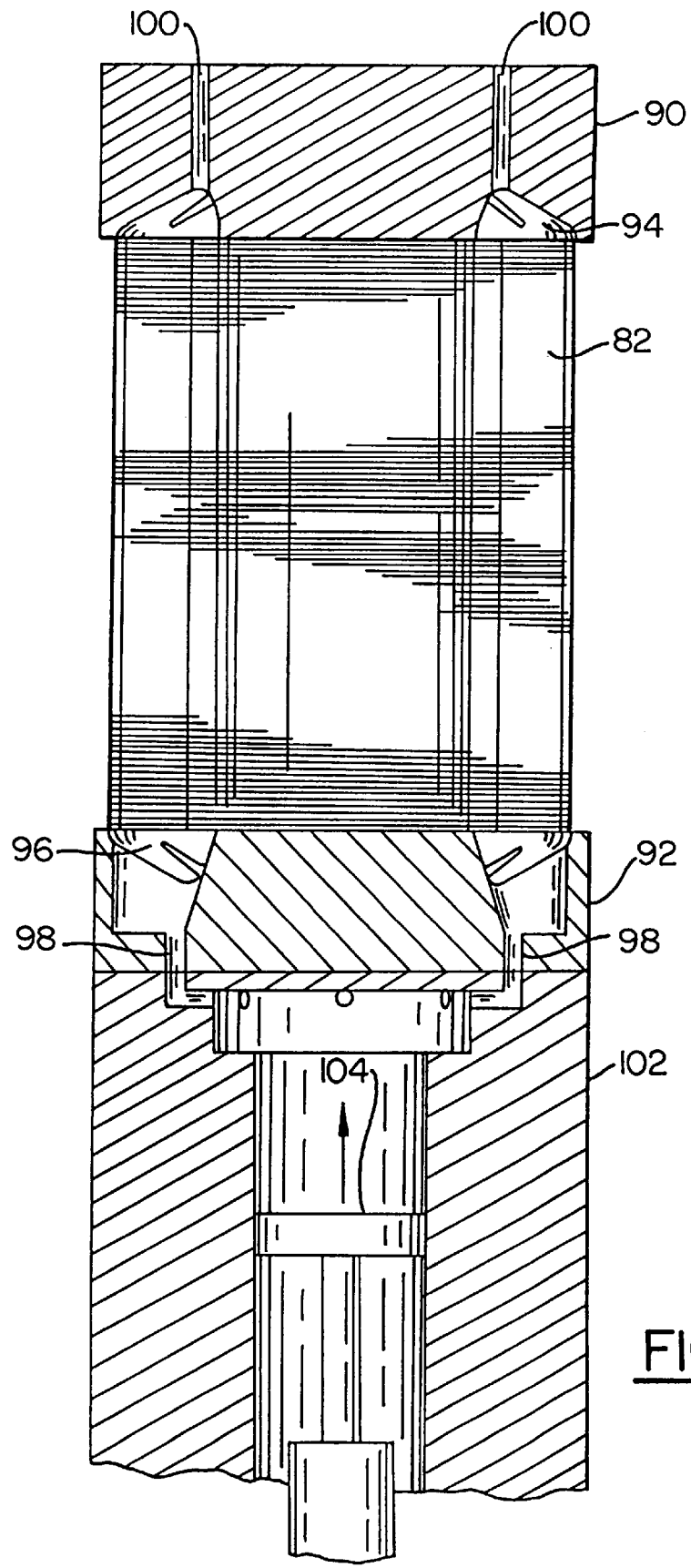
FIG. 7 is a diagrammatic view of the casting process by which a rotor assembly of the present invention may be made.

FIG. 7 diagramatically illustrates the casting process by which rotor assembly 80 may be manufactured. As can be seen, stack 82 is oriented vertically between a pair of casting molds 90 and 92. Casting molds 90 and 92 define respective cavities 94 and 96 in the shape of the end ring to be formed. In addition to providing the basic shape of the main ring portion, the cavities also define the fan blades and mounting sprews. Lower casting mold 92 includes a plurality of inlet passages 98 through which molten metal is forced. Upper casting mold 90 defines a plurality of air escape orifices 100 to allow egress of displaced air.

As shown, lower casting mold 92 rests upon a piston block 102. Piston block 102 defines a cylinder through which a piston 104 reciprocatively moves. As piston 104 moves in the upper direction, molten metal will be forced into inlet passage 98. The molten metal will first fill lower cavity 96, and then proceed upwardly along the conductor channels defined in stack 82. As additional metal is forced into inlet passages 98, cavity 94 will be filled. Due to the shape of cavity 94, displaced air will be advantageously guided toward air escape orifices 100.

It can thus be seen that the present invention provides various improvements in the construction of a rotor assembly for use in an electric motor. While preferred embodiments of the invention have been shown and described, one skilled in the art will appreciate that modifications and variations may be made thereto without departing from the spirit and scope of the present invention. For example, it may be desirable in some cases to "ripple" the annular peak of the end rings so that either sprews or fan blades will be slightly raised with respect to the other. For example, if the casting mold has air escape orifices located above the sprews, it may be desirable to ripple the annular peak so that the base of the sprews is slightly raised with respect to the base of adjacent fan blades. This may further facilitate the flow of escaping air.

In addition, it should be understood that aspects of the various embodiments may be interchanged both in whole or in part. Furthermore, those of ordinary skill in the art will appreciate that the foregoing description is by way of example only, and is not intended to be limitative of the invention so further described in the appended claims.

What is claimed is:

1. An electric motor comprising:
    a housing structure;
    a shaft rotatably supported by said housing structure along a predetermined central axis;
    a stator fixed with respect to said housing structure, said stator having a plurality of conductive windings radially spaced about said central axis;
    a rotor located radially inward of said stator and fixed with respect to said shaft, said rotor including first and second end ring structures respectively located at each end thereof, both of said end ring structures defining a first surface tapering from a location nearer an outer diameter of said rotor and a second surface tapering from a location nearer an inner diameter of said rotor, said first surface and said second surface converging to define an annular peak;
    a plurality of spaced apart mounting sprews located on each of said annular peaks; and
    a plurality of axial fan blades located on each of said end ring structures.

2. An electric motor as set forth in claim 1, wherein said first surface of each of said end ring structures tapers at an angle of at least 30° with respect to a transverse dimension.

3. An electric motor as set forth in claim 1, wherein respective of said sprews are located between adjacent pairs of said fan blades.

4. A rotor assembly for use in an electric motor of the induction type, said rotor assembly comprising:
    a magnetically permeable core defining a plurality of parallel conductor channels extending axially thereal-ong;
    a plurality of conductor bars located in respective of said conductor channels;
    first and second end ring structures respectively located at each end of said core, said conductor bars being electrically connected by said end ring structures to provide a squirrel cage winding;
    each of said end ring structures including a plurality of axial fan blades; and
    each of said end ring structures defining a first surface tapering from a location nearer an outer diameter of said core and a second surface tapering from a location nearer an inner diameter of said core, said first surface and said second surface converging to form an annular peak; and a plurality of spaced apart mounting sprews located on said annular peak.

5. A rotor assembly as set forth in claim 4, wherein said first surface of each of said end ring structures tapers at an angle of at least 30° with respect to a transverse dimension.

6. A rotor assembly as set forth in claim 4, wherein respective of said sprews are located between adjacent pairs of said fan blades.

7. A rotor assembly as set forth in claim 4, wherein said conductor bars and said end ring structures are substantially coextensive in radial width.

8. A rotor assembly as set forth in claim 4, wherein said magnetically permeable core is formed from a multiplicity of individual laminations arranged in a stack.

* * * * *